United States Patent
Kim et al.

(10) Patent No.: US 8,884,874 B1
(45) Date of Patent: Nov. 11, 2014

(54) DIGITAL DEVICE AND CONTROL METHOD THEREOF

(71) Applicant: LG Electronics Inc., Seoul (KR)

(72) Inventors: Yongsin Kim, Seoul (KR); Jongho Kim, Seoul (KR); Doyoung Lee, Seoul (KR); Jihwan Kim, Seoul (KR); Sinae Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/151,387

(22) Filed: Jan. 9, 2014

(30) Foreign Application Priority Data

Oct. 31, 2013 (KR) ........................ 10-2013-0131230

(51) Int. Cl.
    *G09G 5/00* (2006.01)
    *G06F 3/033* (2013.01)
    *G06F 3/01* (2006.01)

(52) U.S. Cl.
    CPC ..................................... *G06F 3/017* (2013.01)
    USPC ........... 345/156; 455/41.3; 715/863; 345/158

(58) Field of Classification Search
    USPC ............. 345/2.1–2.3, 156, 158; 455/41.3, 39; 715/863, 864
    See application file for complete search history.

(56) References Cited

U.S. PATENT DOCUMENTS

| | | | |
|---|---|---|---|
| 2009/0197615 A1* | 8/2009 | Kim et al. | 455/456.1 |
| 2010/0124949 A1 | 5/2010 | Demuynck et al. | |
| 2011/0018731 A1 | 1/2011 | Linsky et al. | |
| 2011/0070829 A1 | 3/2011 | Griffin et al. | |
| 2011/0197147 A1 | 8/2011 | Fai | |
| 2011/0250930 A1* | 10/2011 | Jung et al. | 455/566 |
| 2011/0275391 A1* | 11/2011 | Lee et al. | 455/500 |
| 2012/0289160 A1 | 11/2012 | Palin et al. | |
| 2012/0295661 A1* | 11/2012 | Kim et al. | 455/556.1 |
| 2013/0222270 A1 | 8/2013 | Winkler et al. | |

* cited by examiner

*Primary Examiner* — Jimmy H Nguyen
(74) *Attorney, Agent, or Firm* — Birch, Stewart, Kolasch & Birch, LLP

(57) ABSTRACT

Discussed are a digital device and a control method thereof. The digital device includes a communication unit configured to transmit/receive a signal with an external device; a gesture sensor unit configured to sense a gesture with respect to the digital device; and a processor configured to control the communication unit and the gesture sensor unit, wherein the processor is further configured to: provide a first mode corresponding to a first event when occurrence of the first event is detected; transmit a first signal, commanding provision of a second mode corresponding to a second event, to the external device when occurrence of the second event is detected during provision of the first mode; and switch from the first mode to the second mode when detecting a first gesture with respect to the digital device after transmission of the first signal.

24 Claims, 12 Drawing Sheets

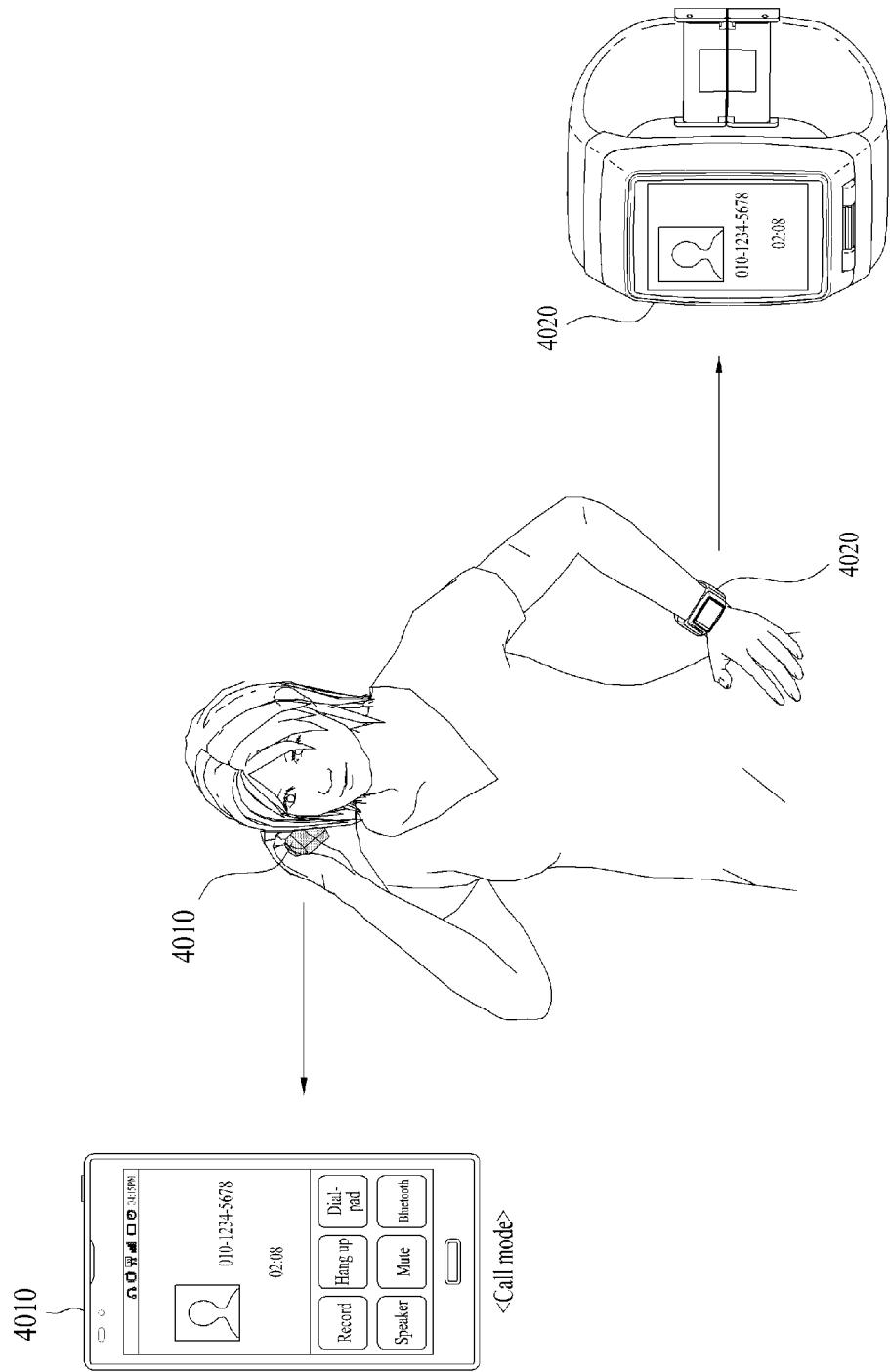

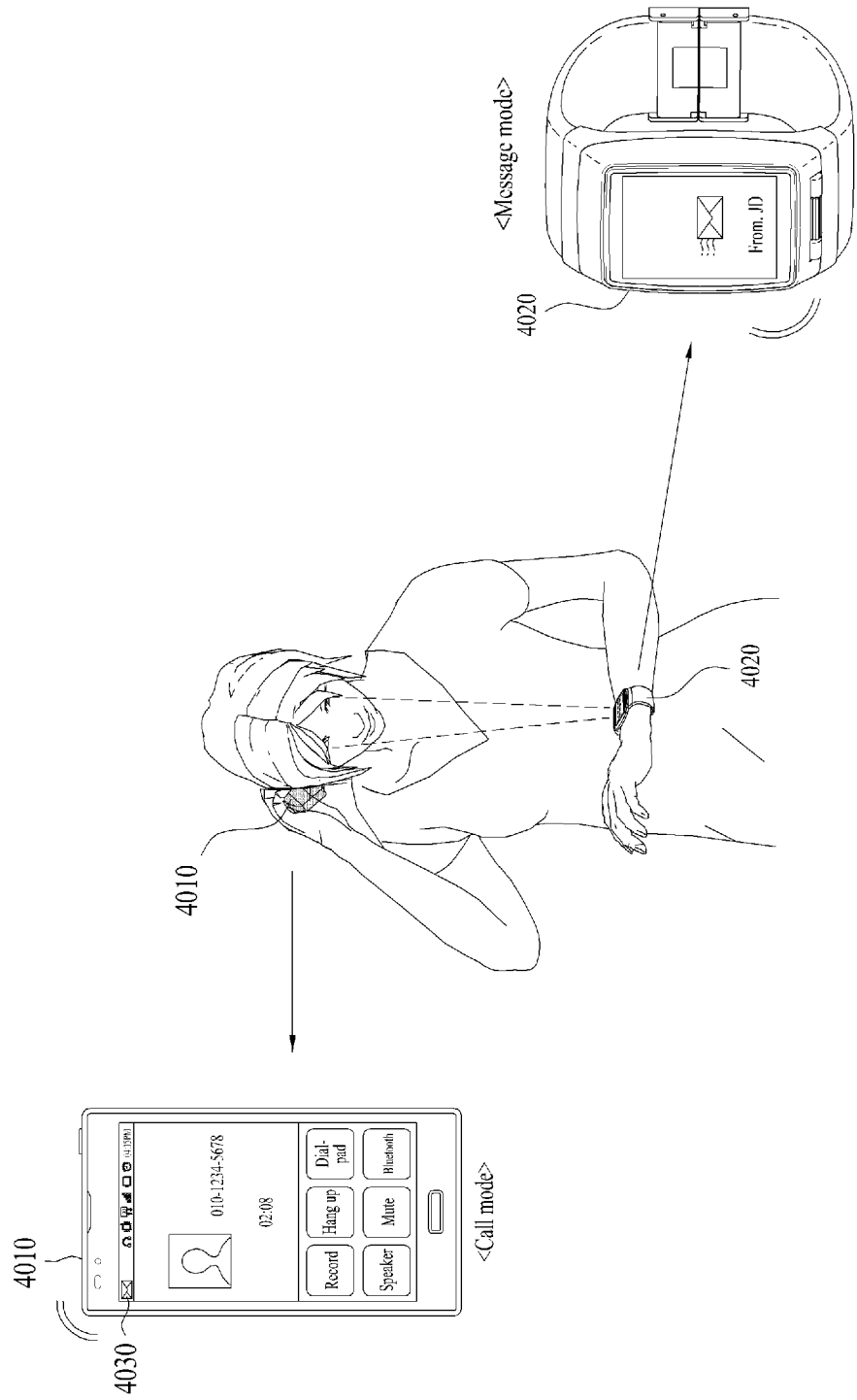

DIGITAL DEVICE AND CONTROL METHOD THEREOF

This application claims the benefit of Korean Patent Application No. 10-2013-0131230, filed on Oct. 31, 2013, which is hereby incorporated by reference as if fully set forth herein.

BACKGROUND OF THE INVENTION

1. Field of the Invention

Embodiments relate to a digital device and, more particularly, to a digital device and a control method thereof in which the digital device have modes in common with an external device and mode switching is controlled according to interaction between the two devices.

2. Discussion of the Related Art

According to technical development, development of wearable devices has been accelerated. Wearable devices refer to devices wearable by persons, such as clothes, watches, glasses, and accessories. Since a user may wear a wearable device, user's accessibility and portability of the wearable device is easy. On the other hand, digital devices, such as smartphones and tablet PCs, may be conveniently used through units, such as human fingers or touch pens, but need to be put into pockets or bags or held by hands and thus be inconvenient.

Therefore, a user may pair a wearable device with a digital device so as to secure portability and accessibility of the digital device. Thereby, the user may secure portability and accessibility of the digital device.

However, since the wearable device should be worn on a user's body always, the wearable device needs to have a small size or a light weight and thus, the screen size of a display unit of the wearable device may be small. Therefore, the user may have difficulty in securing a field of view of contents displayed on the display unit of the wearable device and inputting touch to the display unit. Thus, in a state in which the user watches the contents or inputs touch to the display unit, use of the digital device having low portability and accessibility but having a relatively large screen size of the display unit thereof may be convenient. Particularly, if an incoming call event and an incoming message event occur, devices which effectively reflect user response to the respective events may be selected and the respective devices may properly provide modes corresponding to the respective events.

SUMMARY OF THE INVENTION

Accordingly, embodiments are directed to a digital device and a control method thereof that substantially obviate one or more problems due to limitations and disadvantages of the related art.

Embodiments provide a digital device and an external device which have modes corresponding to events occurring in the digital device and the external device in common.

Further, embodiments provide a digital device and an external device which detect gestures of the respective devices and perform mode switching.

Further, embodiments provide a digital device and an external device which detect predetermined gestures to perform mode switching in various manners.

Additional advantages, objects, and features of the embodiments will be set forth in part in the description which follows and in part will become apparent to those having ordinary skill in the art upon examination of the following or may be learned from practice of embodiments. The objectives and other advantages of embodiments may be realized and attained by the structure particularly pointed out in the written description and claims hereof as well as the appended drawings.

In one embodiment, The digital device includes a communication unit configured to transmit/receive a signal with an external device; a gesture sensor unit configured to sense a gesture with respect to the digital device; and a processor configured to control the communication unit and the gesture sensor unit, wherein the processor is further configured to: provide a first mode corresponding to a first event when occurrence of the first event is detected; transmit a first signal, commanding provision of a second mode corresponding to a second event, to the external device when occurrence of the second event is detected during provision of the first mode; and switch from the first mode to the second mode when detecting a first gesture with respect to the digital device after transmission of the first signal, wherein the external device provides the second mode when the external device receives the first signal, and switches from the second mode to the first mode after a predetermined time.

It is to be understood that both the foregoing general description and the following detailed description of embodiments are exemplary and explanatory and are intended to provide further explanation of embodiments as claimed.

BRIEF DESCRIPTION OF THE DRAWINGS

Arrangements and embodiments may be described in detail with reference to the following drawings in which like reference numerals refer to like elements and wherein:

FIGS. 4A to 4C are views illustrating a digital device and an external device providing modes or switching between modes so as to correspond to events in accordance with one embodiment;

DETAILED DESCRIPTION OF THE INVENTION

Terms used in this specification are general terms widely used in the art in consideration of functions in this specification, but may vary according to intention of those skilled in the art, custom, or advent of new techniques. Further, in some cases, terms may be randomly selected by an applicant, and meanings of these terms are defined in description of corresponding embodiments. Therefore, the definitions of these terms used in this specification should be determined based on the substantial meaning thereof and the whole content of this specification.

Reference will now be made in detail to the preferred embodiments, examples of which are illustrated in the accompanying drawings.

Digital devices stated in this specification may include various devices which may communicate with other devices, such as a smartphone, a tablet PC, a PC, a personal digital assistant (PDA), a notebook, etc. Further, external devices stated in this specification may include wearable devices which may be worn on a user's body and communicate with other devices, such as a smart watch, an HMD, an HUD, a smart ring, etc. Particularly, in this specification, a smartphone as a digital device and a smart watch as an external device will be described.

Figure 1:
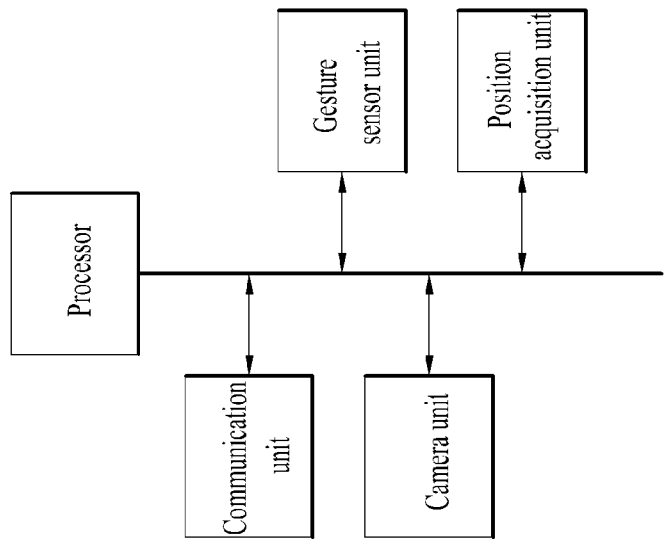
FIG. 1 is a block diagram illustrating a digital device and an external device in accordance with one embodiment.
Figure 1:
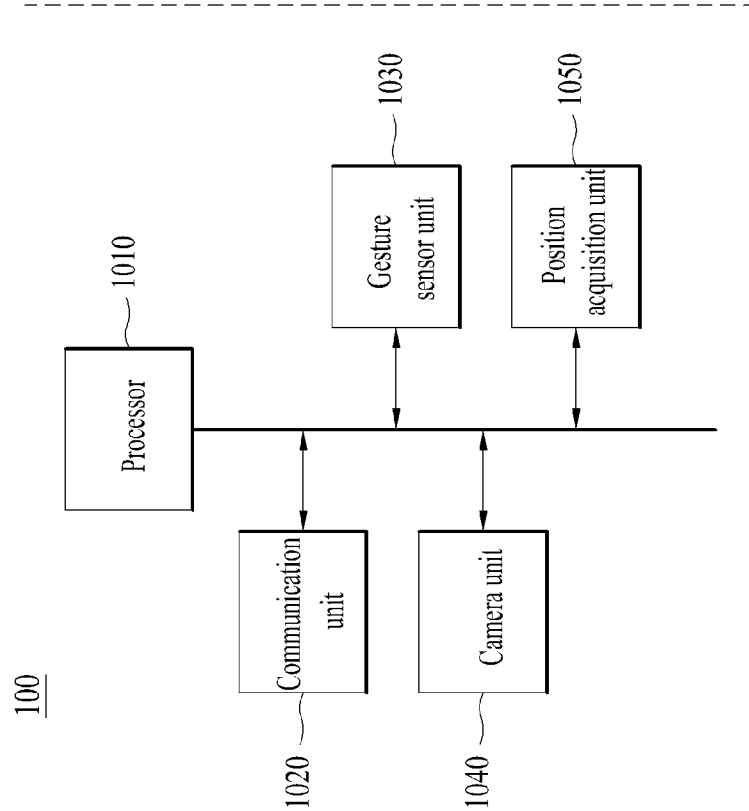

FIG. 1 is a block diagram illustrating a digital device 100 and an external device 110 in accordance with one embodiment. With reference to FIG. 1, the digital device 100 may include a processor 1010, a communication unit 1020, a gesture sensor unit 1030, a camera unit 1040, and a position acquisition unit 1050. Further, the external device 110 may also include a processor, a communication unit, a gesture sensor unit, a camera unit, and a position acquisition unit. Hereinafter, functions of the respective units of the digital device 100 will be described. However, functions of the respective units, which will be described hereinafter, are not limited to the digital device 100 and may be applied to the respective units of the external device 110.

The communication unit 1020 may communicate with the external device 110 using various protocols and thereby, transmit/receive a signal. Further, the communication unit 1020 may be connected to a network by wire or wirelessly and thus, transmit/receive digital data, such as contents. Further, the digital device 100 may pair with the external device 110 using the communication unit 1020.

Particularly, in this specification, the communication unit 1020 may transmit/receive a signal to control the external device 110 or to be controlled by the external device 110. The communication unit 1020 may transmit or receive a signal relating to an event occurring in the digital device 100 or the external device 110 to the external device 110 or from the external device 110. Further, the communication unit 1020 may transmit or receive a signal regarding a mode being provided by the digital device 100 or the external device 110 to the external device 110 or from the external device 110. The processor 1010 may detect an event occurring in the external device 110 and/or a mode being provided by the external device 110 by detecting a signal received from the external device 110 using the communication unit 1020. Further, the processor 1010 may perform a designated command corresponding to a signal received from the external device 110 by detecting the received signal. A more detailed description thereof will be given later with reference to FIG. 2.

The gesture sensor unit 1030 may sense a user gesture with respect to the digital device 100 using at least one sensing unit provided in the digital device 100. In more detail, the gesture sensor unit 1030 may sense the user gesture with respect to the digital device 100 by sensing movement of the digital device 100 using the at least one sensing unit. In accordance with one embodiment, the at least one sensing unit may include sensing units, such as a gravity sensor, a geomagnetic sensor, a motion sensor, a gesture sensor, a gyroscope sensor, an acceleration sensor, a proximity sensor, an infrared sensor, an inclination sensor, a brightness sensor, an altitude sensor, a depth sensor, a pressure sensor, a bending sensor, a camera sensor, a global positioning system (GPS) sensor, and an illumination sensor. The above-described sensors may be included in the digital device 1000 as separate elements or be included in the digital device 100 as at least one united element. Further, the gesture sensor unit 1030 may transmit a signal based on a sensing result to the processor 1010. The processor 1010 may perform a designated command, such as mode switching, by detecting the signal received from the gesture sensor unit 1030.

The camera unit 1040 may capture an image. In more detail, the camera unit 1040 may capture an image within an angle of view of at least one camera sensor provided in the digital device 100 using the at least one camera sensor. Further, the camera unit 1040 may transmit a capturing result to the processor 1010. The processor 1010 may perform a designated command, such as mode switching, by detecting a user image using the camera unit 1040. A detailed description thereof will be given later with reference to FIGS. 7(a) to 7(c) and FIGS. 8(a) to 8(c).

The position acquisition unit 1050 may acquire the position of the digital device 100. Here, the position may include the height, latitude, longitude, and azimuth of the digital device 100. Particularly, in this specification, the position acquisition unit 1050 may acquire the height of the digital device 100. The position acquisition unit 1050 may acquire the position of the digital device 100 using at least one sensing unit provided in the digital device 100. Here, in accordance with one embodiment, the at least one sensing unit may include sensing units, such as a gravity sensor, a geomagnetic sensor, a gyroscope sensor, an acceleration sensor, a proximity sensor, an infrared sensor, an inclination sensor, an altitude sensor, a depth sensor, a pressure sensor, a camera sensor, and a global positioning system (GPS) sensor. The above-described sensors may be included in the digital device 1000 as separate elements or be included in the digital device 100 as at least one united element. Further, the position acquisition unit 1050 may transmit a signal based on a position acquisition result to the processor 1010. The processor 1010 may perform a designated command, such as mode switching, by detecting the signal received from the position acquisition unit 1050.

The processor 1010 may execute various applications by processing data within the digital device 100. Further, the processor 1010 may control the above-described respective units, and control data transmission/reception between the units.

Particularly, in this specification, the processor 110 may detect an event occurring in the digital device 100. Here, events may mean state changes occurring in at least one of the digital device 100 and the external device 110. The events may include an incoming call event, an incoming message event, a schedule notification event, an alarm event, an update notification event, etc. When the processor 1010 detects occurrence of each event, the processor 1010 may provide a mode corresponding thereto. For example, if the processor 1010 detects the incoming call event, the processor 1010 may provide a call mode corresponding to the incoming call event. A more detailed description of mode provision will be given later with reference to FIG. 3.

Further, the processor 1010 may perform mode switching by transmitting/receiving a signal using the communication unit 1020 and detecting the received signal. Here, the signal may be a control signal to control the external device 110 or to be controlled by the external device 110. Otherwise, the signal may be a signal regarding an event occurring in the digital device 100 or the external device 110 and/or a signal regarding the mode being provided by the digital device 100 or the external device 110.

Besides, the processor 1010 may detect a gesture with respect to the digital device 100 using at least one of the communication unit 1020, the gesture sensor unit 1030, the position acquisition unit 1050, and the camera unit 1040. Further, if the processor 1010 detects a predetermined gesture, the processor 1010 may perform mode switching. A detailed description thereof will be given later with reference to FIG. 4, FIGS. 7(*a*) to 7(*c*), and FIGS. 8(*a*) to 8(*c*).

Hereinafter, if each stage or operation performed in the digital device 100 is started or proceeds by sensing an input, it will be presumed that a process of generating a signal according to the sensed input and receiving the signal is carried out without description of such a process. Further, it may be expressed that the processor 1010 controls the digital device 100 or at least one unit included in the digital device 100 according to a designated input, and the processor 1010 and the digital device 100 may be identified with each other.

FIG. 1 is a block diagram of the digital device 100 in accordance with one embodiment, and respective blocks logically discriminately represent elements of the digital device 100. Therefore, the elements of the above-described digital device 100 may be mounted as one chip or a plurality of chips according to design of the digital device 100.

Figure 2:
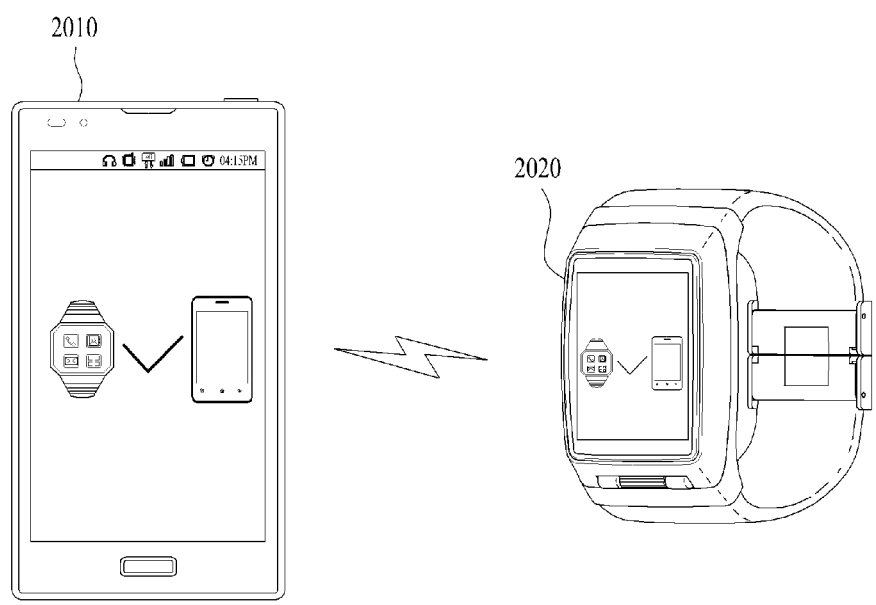
FIG. 2 is a view illustrating a digital device and an external device which may pair with the digital device in accordance with one embodiment.

FIG. 2 is a view illustrating a digital device 2010 and an external device 2020 which may pair with the digital device 2010 in accordance with one embodiment.

The digital device 2010 may pair with the external device 2020 using a communication unit. Here, the external device 2020 may be a smart watch, as described above.

Pairing may represent connection for signal transmission/reception between the digital device 2010 and the external device 2020. If pairing is performed, the digital device 2010 and the external device 2020 perform communication connection, and may transmit/receive a signal uni-directionally and/or bi-directionally. Particularly, the digital device 2010 and the external device 2020 may perform pairing through various communication protocols, such as Bluetooth and near field communication (NFC), etc.

The digital device 2010 and the external device 2020 may perform pairing by detecting inputs to respective devices. Here, the input may include a touch input, a voice input, and a gesture input with respect to the digital device 2010 or the external device 2020. For example, the digital device 2010 may provide a separate button or user interface for communication connection with the external device 2020. Here, a user may perform pairing between the digital device 2010 and the external device 2020 through an input using the separate button or user interface provided by the digital device 2010.

Further, the digital device 2010 may pair with a plurality of external devices 2020. In this case, the digital device 2010 may transmit/receive a signal selectively with some of the plurality of external devices 2020 by performing communication connection.

The digital device 2010 having paired with the external device 2020 may determine a device which will provide a mode corresponding to an occurred event. In more detail, if the digital device 2010 detects occurrence of an event, the digital device 2010 may select a device which may properly provide a mode corresponding to the event and then provide the corresponding mode. A detailed description thereof will be given later with reference to FIGS. 4A to 4C.

In this specification, the external device 2020 does not mean always a device pairing with the digital device 2010, and include a device which may perform communication connection with the digital device 2010. That is, in this specification, the external device 2020 may include various devices which may transmit/receive a signal with the digital device 2010 and thus have modes in common with the digital device 2010.

Figure 3:
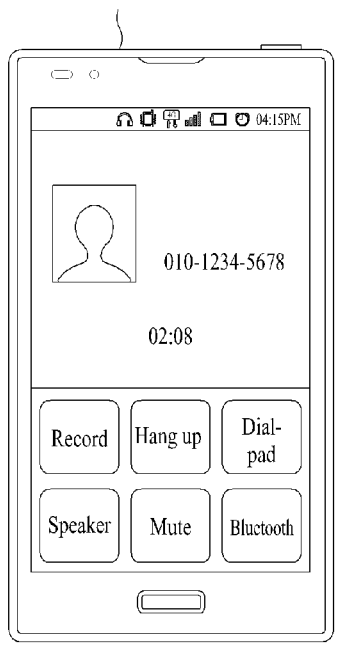
FIG. 3 is a view illustrating a digital device and an external device providing a call mode and a message mode in accordance with one embodiment.
Figure 3:
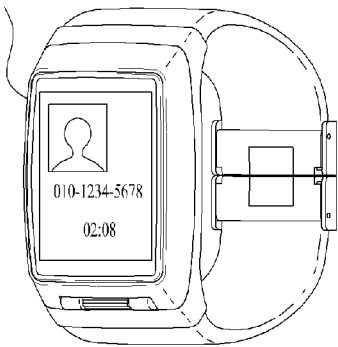
Figure 3:
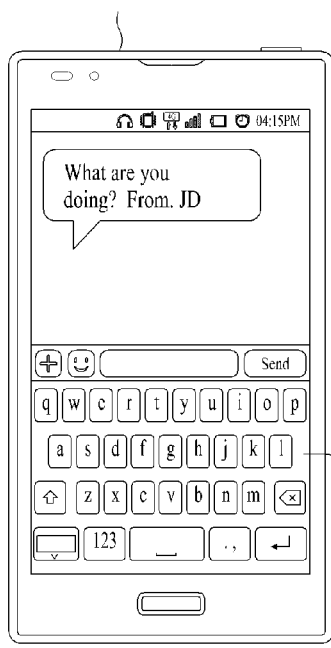
Figure 3:
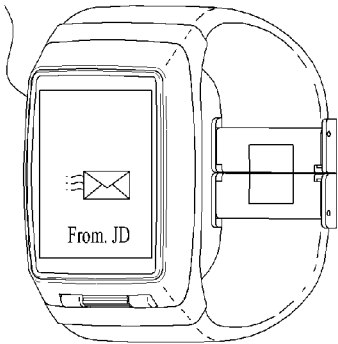

FIG. 3 is a view illustrating a digital device 3010 and an external device 3020 providing a call mode and a message mode in accordance with one embodiment.

In this specification, the digital device 3010 and the external device 3020 may detect occurrence of events. Particularly, in the disclosure, the events may include an incoming call event and an incoming message event. The incoming call event may be an event in which a call is received by the digital device 3010 or the external device 3020. The incoming message event may be an event in which a message is received by the digital device 3010 or the external device 3020. Here, the message may include one of various types of messages received from the outside, such as an SNS message, an e-mail, a text message, a messenger message, etc.

When the digital device 3010 and the external device 3020 detect occurrence of events, the digital device 3010 and the external device 3020 may provide modes corresponding to the events. In accordance with one embodiment, the digital device 3010 and the external device 3020 may provide a call mode corresponding to the incoming call event. Here, the call mode may be a mode providing various functions corresponding to the incoming call event occurring in the digital device 3010 and/or the external device 3020. If the digital device 3010 and the external device 3020 provide the call mode, the digital device 3010 and the external device 3020 may provide various functions regarding the incoming call event, such as a call, call contents recording, call time notification, caller notification, caller phone number notification, hanging up, a dial-pad, a speakerphone, mute, and memo. At this time, the digital device 3010 and the external device 3020 may display a user interface to provide the above-described functions, as exemplarily shown in FIG. 3.

In accordance with another embodiment, the digital device 3010 and the external device 3020 may provide a message mode corresponding to the incoming message event. Here, the message mode may be a mode providing various functions corresponding to the incoming message event occurring in the digital device 3010 and/or the external device 3020. If the digital device 3010 and the external device 3020 provide the message mode, the digital device 3010 and the external device 3020 may provide various functions regarding the incoming message event, such as message confirmation, message holding, response message transmission, reception confirmation, caller notification, caller phone number notification, and message storage.

Particularly, the digital device 3010 and the external device 3020 display a user interface 3030 to transmit a response message to a received message, as exemplarily shown in FIG. 3, and thus, a user may directly input and transmit the response message. However, if the external device 3020 provides such a user interface 3030, the screen size of a display unit thereof is small and thus, the user may feel inconvenient in input of the response message. Therefore, in this case, the digital device 3010 may be selected as a device providing the message mode by the external device 3020, and a detailed description thereof will be given later with reference to FIGS. 4A to 4C.

That is, in this specification, the digital device 3010 and the external device 3020 may provide various modes according to occurred events. Here, the digital device 3010 and the external device 3020 may have the modes corresponding to the events in common. That is to say, the digital device 3010 and the external device 3020 may perform mode switching to modes being provided by the opposite devices according to inputs of the respective devices. A detailed description thereof will be given later with reference to FIGS. 4A to 4C.

However, user interfaces or functions of modes provided by the digital device 3010 and the external device 3020 may differ according to characteristics of the devices. For example, as exemplarily shown in FIG. 3, the digital device 3010 may provide functions, such as call recording, hanging up, a dial-pad, a speaker, mute, Bluetooth, a caller image, and caller phone number notification, and the external device 3020 may provide functions, such as a caller image, caller phone number notification, call time notification. The reason for this is that the external device 3020 has lower display unit utility than the digital device 3010 and thus provides only essential functions regarding the incoming call event. However, such a functional difference is not limited to the above-described embodiment, and may be variously determined according to device size, designing purpose, design, using purpose, and user settings.

Figure 4C:
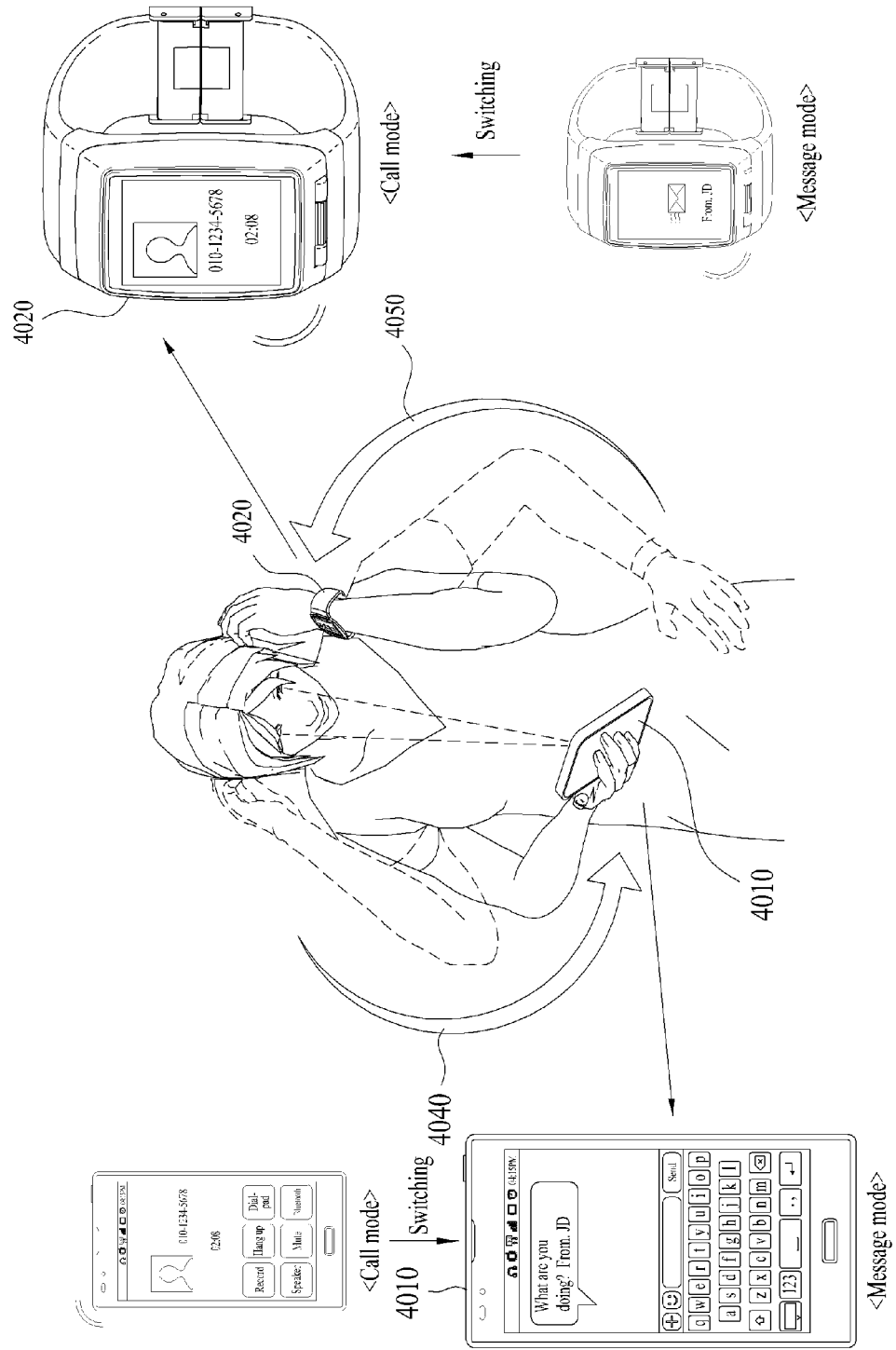

FIGS. 4A to 4C are views illustrating a digital device 4010 and an external device 4020 providing modes or switching between modes so as to correspond to events in accordance with one embodiment. Hereinafter, for convenience of description, FIGS. 4A to 4C will be individually described. The digital device 4010 and the external device 4020 may be operated in order of FIGS. 4A to 4C.

FIG. 4A is a view illustrating the digital device 4010 and the external device 4020 in accordance with one embodiment in which an incoming call event occurs. As exemplarily shown in FIG. 4A, in this embodiment, the digital device 4010 and the external device 4020 may be located on different hands of a user.

As described above, the digital device 4010 and the external device 4020 may detect the incoming call event occurring in the digital device 4010 and/or the external device 4020. Further, the digital device 4010 and the external device 4020 may provide a call mode corresponding to the incoming call event. In this embodiment, the case in which the digital device 4010 detects the incoming call event and provides the call mode will be exemplarily described.

If the digital device 4010 provides the call mode, the external device 4020 may not perform any operation. Therefore, the external device 4020 may maintain execution of an application which is being executed or maintain display of a screen which is being displayed. Otherwise, the external device 4020 may receive information regarding the call mode by performing communication with the digital device 4010 which is providing the call mode. When the external device 4020 receives the corresponding information, the external device 4020 may display additional information regarding the call mode. For example, as exemplarily shown in FIG. 4A, the external device 4020 may display additional information, such as information of a current caller and call time. Thereby, a user may receive brief information of the incoming call event in real time through the external device 4020. That is, if the digital device 4010 detects the incoming call event and provides the call mode, the external device 4020 may not perform any operation or may display additional information of the corresponding call mode.

On the other hand, although not shown in FIG. 4A, if the external device 4020 provides the call mode, the digital device 4010 may not perform any operation or may provide brief information of the call mode provided by the external device 4020.

FIG. 4B is a view illustrating the digital device 4010 and the external device 4020 in accordance with one embodiment in which an incoming message event occurs.

While the digital device 4010 is providing the call mode, an incoming message event may occur in the digital device 4010 and/or the external device 4020. The message event may be an event regarding the most recently received message. Then, the digital device 4010 or the external device 4020 may select a device which will provide the message mode corresponding to the incoming message event. In more detail, the digital device 4010 or the external device 4020 may select a device which will provide the message mode in consideration of modes of the respective devices and/or characteristics of the respective devices. For example, if the digital device 4010 is providing the call mode, the external device 4020 may be selected as a device which will provide the message mode. The reason for this is that the user's field of view of a device being providing the call mode is not sufficiently secured and thus, the message mode including visual information is provided through the other device being easy to secure a field of view.

Here, the digital device 4010 and the external device 4020 may detect modes of the respective devices by transmitting/receiving signals in various manners using communication units.

In accordance with one embodiment, if the digital device 4010 detects an incoming message event while providing the call mode, the digital device 4010 may transmit a signal notifying that the digital device 4010 is currently providing the call mode and/or commanding provision of the message mode to the external device 4020. When the external device 4020 receives the corresponding signal, the external device 4020 may detect the call mode of the digital device 4010. Consequently, the external device 4020 may provide the message mode corresponding to the incoming message event.

In the same manner, if the digital device 4010 detects an incoming call event while providing the message mode, the digital device 4010 may transmit a signal notifying that the digital device 4010 is currently providing the message mode and/or commanding provision of the call mode to the external device 4020. When the external device 4020 receives the corresponding signal, the external device 4020 may detect the message mode of the digital device 4010. Consequently, the external device 4020 may provide the call mode corresponding to the incoming call event.

In accordance with another embodiment, when the external device 4020 detects the incoming message event, the external device 4020 may transmit a mode confirmation request signal to the digital device 4010 so as to detect the mode of the digital device 4010. When the digital device 4010 receives the mode confirmation request signal, the digital device 4010 may transmit a signal notifying of the mode of the digital device 4010 or commanding provision of the message mode to the external device 4020. When the external device 4020 receives the corresponding signal, the external device 4020 may detect the mode of the digital device 4010 according to the received signal and provide various modes.

In the same manner, when the external device 4020 detects the incoming call event while the digital device 4010 is providing the message mode, the external device 4020 may transmit a mode confirmation request signal to the digital device 4010. Consequently, the external device 4020 may detect the message mode of the digital device 4010 and provide the call mode.

In accordance with another embodiment, if the external device 4020 is providing additional information regarding the call mode of the digital device 4010, as described above with reference to FIG. 4A, the external device 4020 may directly provide the message mode without additional signal transmission/reception. Because, since the additional information regarding the call mode of the digital device 4010 is being provided, it may be understood that the external device 4020 has recognized the mode of the digital device 4010 in advance.

When the digital device 4010 and the external device 4020 detect the incoming message event, the digital device 4010 and the external device 4020 may provide notifications regarding the corresponding event. However, in this case, the device which is providing the call mode and the device which will provide the message mode may provide different kinds of notifications. For example, if the digital device 4010 is providing the call mode and the external device 4020 is selected as a device which will provide the message mode, the digital device 4010 may provide tactile, auditory and/or olfactory notifications, and the external device 4020 may provide visual, tactile, auditory and/or olfactory notifications.

The reason for this is that, since a user's field of view of the digital device 4010 which is providing the call mode is not sufficiently secured, it may be more effective that a device sufficiently securing a field of view provides a visual notification. However, if a user moves the digital device 4010 during call and thus the sufficient field of view of a display unit of the digital device 4010 is sufficiently secured, a visual notification 4030 may be additionally provided by detecting such movement of the digital device 4010.

FIG. 4C is a view illustrating the digital device 4010 and the external device 4020 in accordance with one embodiment which perform mode switching.

The digital device 4010 and the external device 4020 may perform mode switching by detecting inputs to the respective devices. Here, the input of each device may be one of various inputs, such as a gesture input, a gaze input, etc., to the corresponding device, and a detailed description thereof will be given later with reference to FIGS. 7(a) to 7(c) and FIGS. 8(a) to 8(c). In this embodiment, a mode switching based on a gesture input as an input of each device will be described.

When the digital device 4010, which is providing the call mode, detects a predetermined gesture with respect to the digital device 4010, the digital device 4010 may perform mode switching. In more detail, when the digital device 4010, which is providing the call mode, detects the predetermined gesture with respect to the digital device 4010, the digital device 4001 may switch from the call mode to the message mode.

Here, the predetermined gesture may be a gesture 4040 of moving the digital device 4010 to secure a field of view of the digital device 4010. Because, in terms of characteristics of the message mode providing visual information, it may be necessary to sufficiently secure a user's field of view of the digital device 4010. Therefore, in this embodiment, the predetermined gesture may be the gesture 4040 of moving the digital device 4010 downward.

Further, the predetermined gesture may be a gesture detected within a predetermined time after provision of the message mode by the external device 4020. Because it may be understood that movement of the digital device 4010 within the predetermined time after provision of the message mode by the external device 4020 serves to cause a user to confirm an incoming message or to write a response message to the incoming message.

Since the external device 4020 may be worn on the user's body, the screen size of the display unit of the external device 4020 may be smaller than that of the digital device 4010. As a result, the user may feel inconvenient in confirmation of the incoming message or writing of the response message to the incoming message through the small display unit of the external device 4020. Therefore, the user may desire to confirm the incoming message or to write the response message using the digital device 100 having the display unit of the relatively large screen size. In consideration of the above description, when the digital device 4010 in accordance with this embodiment detects the incoming message event while providing the call mode and detects the gesture of securing the field of view of the digital device 4010, the digital device 4010 may switch from the call mode to the message mode so that the user may more easily and conveniently use functions provided in the message mode.

On the other hand, the external device 4020, which is providing the message mode, may switch from the message mode to the call mode after a predetermined time from provision of the message mode. Here, the predetermined time may be a time for the external device 4020 to detect the predetermined gesture with respect to the external device 4020 after provision of the message mode by the external device 4020. That is, if the external device 4020 detects the predetermined gesture with respect to the external device 4020 while providing the message mode, the external device 4020 may switch from the message mode to the call mode.

Here, the predetermined gesture may be a gesture 4050 of moving the external device 4020 upward. Further, the predetermined gesture may be the gesture 4050 of moving the external device 4020 toward a user's ear or lip. User's movement of the external device 4020 toward the user's ear or lip may be regarded as a proper gesture to secure a proper call state. Therefore, when such a predetermined gesture is detected, the external device 4020 may switch to the call mode which the digital device is providing.

The above-described mode switching of the two devices may be performed separately from or simultaneously with mode switching of the opposite devices according to embodiments. That is to say, according to embodiments, mode switching of one device may influence or may not influence mode switching of the other device.

In accordance with one embodiment, if the mode switching of the two devices 4010 and 4020 may be independently performed, the respective devices 4010 and 4020 may independently perform mode switching by detecting the predetermined gestures with respect to the respective devices 4010 and 4020. The mode switching of the respective devices 4010 and 4020 have been described above.

That is, the mode switching of the respective devices 4010 and 4020 may be performed independently of the mode switching of the opposite devices 4020 and 4010. When the mode switching of the respective devices 4010 and 4020 are performed, the respective devices 4010 and 4020 may transmit/receive signals notifying of mode switching to the opposite devices 4020 and 4010. For example, if the digital device 4010 switches from the call mode to the message mode, the digital device 4010 may transmit a signal, notifying of switching to the message mode, to the external device 4020. On the other hand, if the external device 4020 switches from the message mode to the call mode, the external device 4020 may transmit a signal, notifying of switching to the call mode, to the digital device 4010. When the respective devices 4010 and 4020 receive the signals notifying of mode switching, the respective devices 4010 and 4020 may detect the modes of the opposite devices 4020 and 4010.

In accordance with another embodiment, if the mode switching of the two devices 4010 and 4020 may be dependently performed, the respective devices 4010 and 4020 may perform the mode switching by simultaneously detecting the predetermined gestures with respect to the respective devices 4010 and 4020. For example, when the predetermined gesture with respect to the digital device 4010 and the predetermined gesture with respect to the external device 4020 are simultaneously detected, the digital device 4010 and the external device 4020 may switch from the current modes thereof to the modes provided by the opposite devices 4020 and 4010. Therefore, if the digital device 4010 provides the call mode and the external device 4020 provides the message mode, the digital device 4010 may switch from the call mode to the message mode being provided by the external device 4020 and the external device 4020 may switch from the message mode to the call mode being provided by the digital device 4010, simultaneously. That is, in this embodiment, the digital device 4010 and the external device 4020 may dependently perform mode switching, and, in case of mode switching, may perform mode switching to the modes being provided by the opposite devices 4020 and 4010. In this embodiment, 'simultaneously' represents substantially the same time. Therefore, a designated time error range may be allowed.

The digital device 4010 and the external device 4020 may perform the above-described simultaneous mode switching in various manners.

In accordance with one embodiment, the digital device 4010 and the external device 4020 may perform the simultaneous mode switching by transmitting/receiving designated signals with the opposite devices 4020 and 4010. Here, the designated signals may be signals notifying detection of the predetermined gestures with respect to the respective devices 4010 and 4020 or a standby signal to perform the simultaneous mode switching. When the digital device 4010 or the external device 4020 detects the predetermined gesture of each device 4010 or 4020, the digital device 4010 or the external device 4020 may transmit a corresponding signal to the opposite device 4020 or 4010. Here, when the digital device 4010 or the external device 4020 receives the same kind of signal from the opposite device 4020 or 4010 within a predetermined time after transmission of the corresponding signal to the opposite device 4020 or 4010, the digital device 4010 or the external device 4020 may perform the mode switching.

Otherwise, the digital device 4010 or the external device 4020 may receive a corresponding signal from the opposite device 4020 or 4010. Here, when the digital device 4010 or the external device 4020 detects the predetermined gesture with respect to each device 4010 or 4020 within a predetermined time after reception of the corresponding signal from the opposite device 4020 or 4010, the digital device 4010 or the external device 4020 may perform the mode switching. Further, the digital device 4010 or the external device 4020 may receive may transmit a signal commanding mode switching to the opposite device 4020 or 4010 simultaneously with performing of the mode switching. The opposite device 4020 or 4010 having received the corresponding signal may perform mode switching according to the received signal.

However, even in this case, when the mode switching of each device 4010 or 4020 is performed, the digital device 4010 or the external device 4020 may detect the mode of the opposite device 4020 or 4010 by additionally transmitting/receiving a signal notifying of the mode switching mode with the opposite device 4020 or 4010.

Although not shown in FIG. 4C, if the digital device 4010 is providing the message mode and the external device 4020 is providing the call mode, the above description may be applied. However, in this case, the predetermined gesture with respect to the digital device 4010 may be a gesture of moving the digital device 4010 toward the user's face and the predetermined gesture with respect to the external device 4020 may be a gesture of moving the external device 4020 to secure the field of view of the display unit of the external device 4020. Therefore, if the digital device 4010 detects a gesture of moving the digital device 4010 upward while providing the message mode, the digital device 4010 may switch from the message mode to the call mode. On the other hand, if the external device 4020 detects a gesture of moving the external device 4020 downward while providing the call mode, the external device 4020 may switch from the call mode to the message mode.

Figure 5:
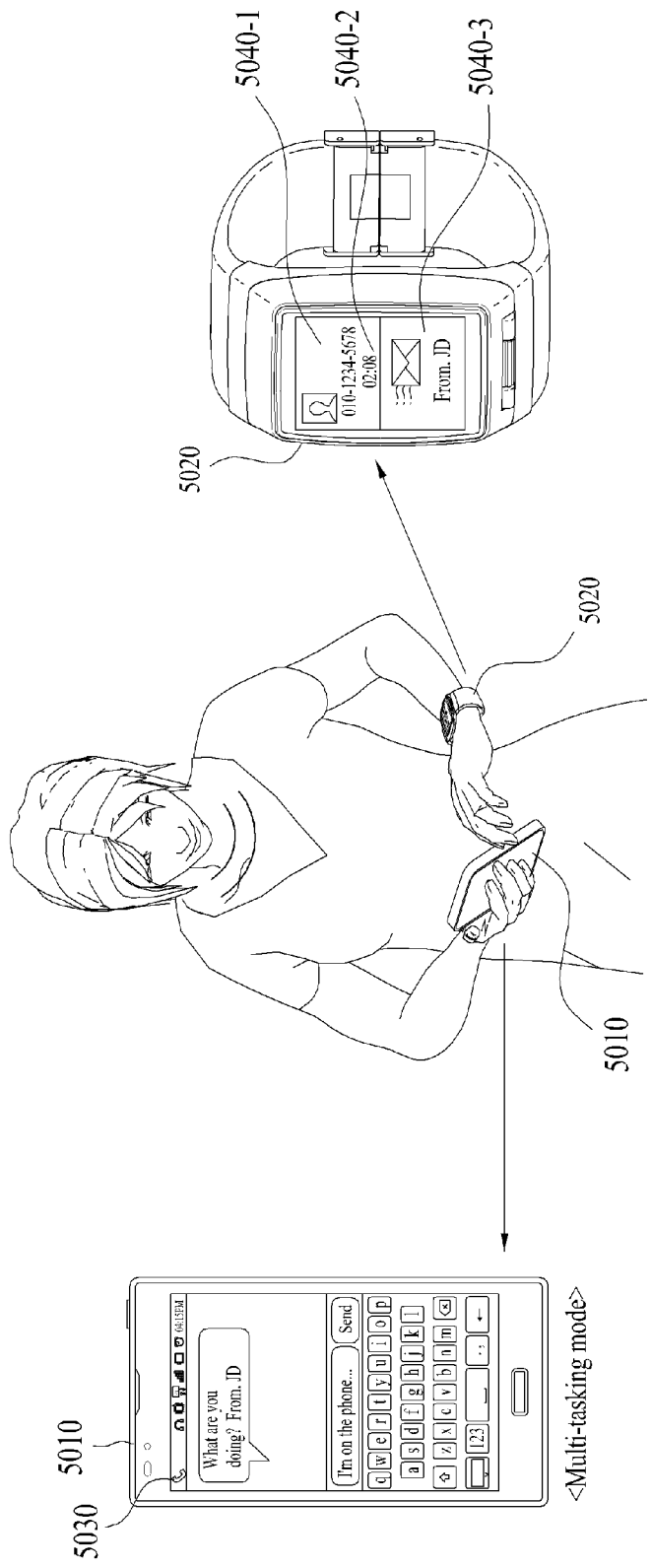
FIG. 5 is a view illustrating a digital device and an external device providing a multi-tasking mode in accordance with one embodiment.

FIG. 5 is a view illustrating a digital device 5010 and an external device 5020 providing a multi-tasking mode in accordance with one embodiment. This embodiment may be performed as the next motion after the motion of FIG. 4B.

While the digital device 5010 is providing the call mode and the external device 5020 is providing the message mode, when the predetermined gesture with respect to the digital device 5010 is detected, the digital device 5010 may switch from the call mode to the multi-tasking mode. Otherwise, while the digital device 5010 is providing the message mode and the external device 5020 is providing the call mode, when the predetermined gesture with respect to the external device 5020 is detected, the digital device 5010 may switch from the message mode to the multi-tasking mode. In this specification, the multi-tasking mode may be a mode in which both the call mode and the message mode are provided. Hereinafter, for convenience of description, the case in which the digital device 5010 is providing the call mode and the external device 5020 is providing the message mode will be exemplarily described.

When the digital device 5010 detects a user gesture to secure the field of view of the digital device 5010, the digital device 5010 may perform switching to the multi-tasking mode. In accordance with one embodiment, the digital device 5010 may switch from the call mode to the multi-tasking mode by detecting downward movement of the digital device 5010.

However, in this case, the digital device 5010 may perform the mode switching by additionally judging whether or not the predetermined gesture with respect to the external device 5020 is detected. If the digital device 5010 does not additionally detect the predetermined gesture with respect to the external device 5020, the digital device 5010 may perform the above-described switching to the multi-tasking mode. On the other hand, if the digital device 5010 additionally detects the predetermined gesture with respect to the external device 5020, the digital device 5010 may perform the switching to the message mode or the call mode, as described above with reference to FIG. 4C. Here, the digital device 5010 may perform judgment as to whether or not the predetermined gesture with respect to the external device 5020 is detected by transmitting/receiving signals with the external device 5020, as described above with reference to FIG. 4C.

That is, this embodiment describes operation of the digital device 5010 providing both the call mode and the message mode, if only the predetermine gesture with respect to the digital device 5010 is detected.

In the multi-tasking mode, the digital device 5010 may provide a speakerphone function to a user in response to the incoming call event. Therefore, the user may speak over the phone using the speakerphone function without movement of the digital device 5010 toward the user's ear or lip, as exemplarily shown in FIG. 5. Particularly, the user may speak over the phone using the speakerphone function under the condition that the field of view of the digital device 5010 is secured.

Therefore, the user may write a response message to an incoming message, simultaneously with a call using the speakerphone function.

At this time, the digital device 5010 may simultaneously display a user interface causing the user to write the response message and display an indicator 5030 indicating taking over the phone through a speakerphone. Thereby, the user may recognize that the digital device 5010 is currently providing both the call mode and the message mode.

Further, if the digital device 5010 is providing the multi-tasking mode, the external device 5020 may maintain provision of the message mode. Otherwise, the external device 5020 may receive information regarding the multi-tasking mode from the digital device 5010 and display brief information regarding the multi-tasking mode. For example, the external device 5020 may briefly display an incoming call caller number 5040-1, a call time 5040-2, and message sender information 5040-3.

Figure 6:
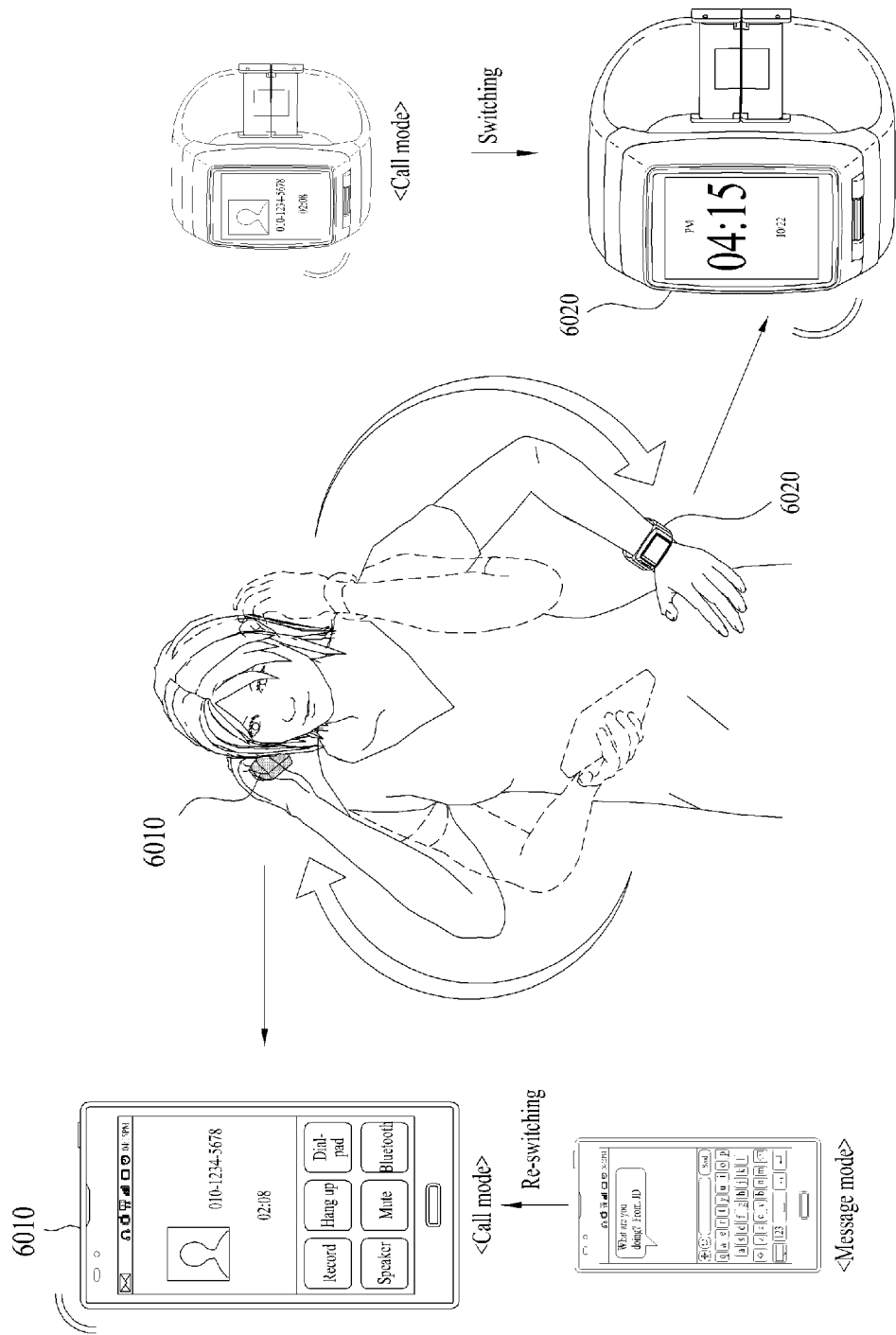
FIG. 6 is a view illustrating a digital device and an external device performing mode switching in accordance with one embodiment.

FIG. 6 is a view illustrating a digital device 6010 and an external device 6020 performing mode switching in accordance with one embodiment. This embodiment may be performed as the next motion after the motion of FIG. 4C.

When the predetermined gestures of the respective devices 6010 and 6020 are additionally detected after switching of the digital device 6010 to the message mode and switching of the external device 6002 to the call mode, the respective devices 6010 and 6020 may return to their originally provided modes or be switched to a standby mode. That is, when the predetermined gestures are additionally detected after performance of the mode switching of the respective devices 6010 and 6020, as described above with reference to FIG. 4C, the digital device 6010 may be switched to the call mode and the external device 6002 may be switched to the standby mode. Here, the standby mode may be a standby state in which the call mode and/or the message mode will be provided.

If writing and transmission of a response message has been completed, a user may again desire to speak over the phone using the digital device 6010. In this case, the digital device 6010 may perform a re-switching to the call mode, which has been originally provided by the digital device 6010, by detecting a predetermined gesture with respect to the digital device 6010. In this embodiment, the predetermined gesture may be a gesture of moving the digital device 6010 toward the user's face. For example, the predetermined gesture may be a gesture of moving the digital device 6010 upward. When the corresponding gesture is detected, the digital device 6010 may re-switch from the message mode to the call mode.

Otherwise, the external device 6020 may perform a switching to the standby mode by detecting a predetermined gesture with respect to the external device 6020. Since message transmission has been completed, return to the message mode may not be necessary. Therefore, the external device 6020 may be switched to the standby mode so as to detect occurrence of a new incoming event or detect a user input, instead of return to the message mode. In this embodiment, the predetermined gesture may be a gesture of moving the external device 6020 downward. For example, the predetermined gesture may be a gesture of moving the external device 6020 in a direction of being away from the user's face. When the corresponding gesture is detected, the external device 6020 may switch from the call mode to the standby mode.

In consideration of the above description, if the mode switching gesture with respect to the external device 6020 is detected under the condition that transmission of the response message through the digital device 6010 has not been completed, the external device 6020 may return to the message mode rather than the standby mode. The external device 6020 returned to the message mode may continuously provide the message mode regarding the response message, transmission of which has not been completed. The user may complete writing of an incomplete response message and transmit the response message through the external device 6020 returned to the message mode.

Further, as described above with reference to FIG. 4C, the above-described mode re-switching of the digital device 6010 and the external device 6020 may be performed separately from or simultaneously with mode switching of the opposite devices 6020 and 6010. Such mode re-switching of the respective devices 6010 and 6020 are the same as the mode switching of the two devices shown in FIG. 4C, and a detailed description thereof will thus be omitted.

Although not shown in FIG. 6, even in the embodiment in which the digital device 6010 switches from the message mode to the call modes and/or the external device 6020 switches from the call mode to the message mode, as described above with reference to FIG. 4B, the mode re-switching of the respective devices 6010 and 6020 may be performed by additionally detecting predetermined gestures with respect to the respective devices 6010 and 6020. In this case, the predetermined gesture with respect to the digital device 6010 for mode re-switching may be a gesture of moving the digital device 6010 far away from the user's face and the predetermined gesture with respect to the external device 6020 for mode re-switching may be a gesture of moving the external device 6020 close to the user's face. Therefore, if the digital device 6010 switched to the call mode detects the gesture of moving the digital device 6010 far away from the user's face, the digital device 6010 may switch from the call mode to the standby mode. However, in this embodiment, if there is a response message, transmission of which has not be completed, the digital device 6010 may switch from the call mode to the message mode other than the standby mode. Further, if the external device 6020 switched to the message mode detects the gesture of moving the external device 6020 close to the user's face, the external device 6020 may re-switch from the message mode to the call mode.

Figure 7:
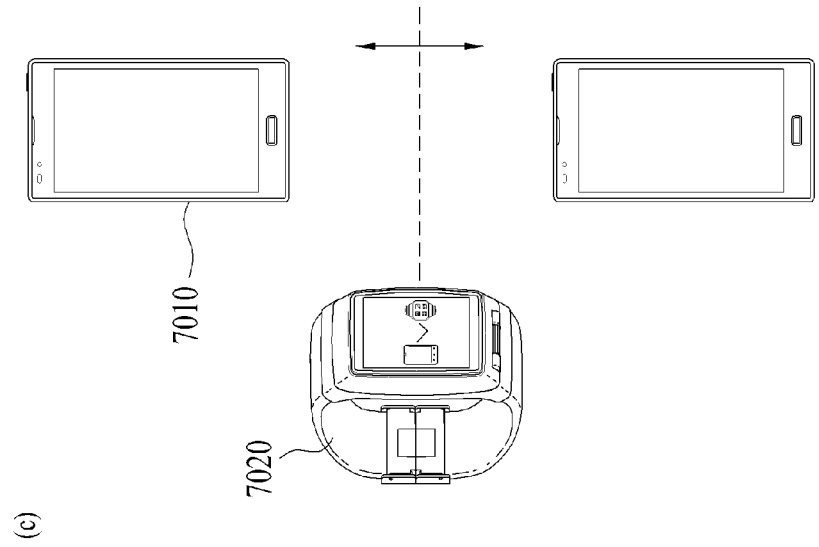
FIGS. 7(a) to 7(c) are views illustrating various predetermined gestures with respect to a digital device in accordance with embodiments.
Figure 7:
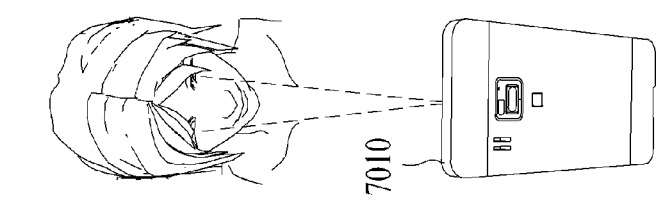
Figure 7:

FIGS. 7(*a*) to 7(*c*) are views illustrating various predetermined gestures of a digital device 7010 in accordance with embodiments. Particularly, FIGS. 7(*a*) to 7(*c*) illustrate various methods of detecting a predetermined gesture in switching of the digital device 7010 from the call mode to the message mode in accordance with embodiments. These embodiments may be applied to switching of an external device 7020 from the call mode to the message mode.

First, the digital device 7010 may detect a gesture of moving the digital device 7010 toward a user's gaze area as the predetermined gesture for switching to the message mode. The reason for this is that, in order to cause a user to properly use the functions provided by the message mode, the user's field of view of the digital device 7010 needs to be sufficiently secured. The digital device 7010 may detect the predetermined gesture in various manners.

In accordance with one embodiment, as exemplarily shown in FIG. 7(*a*), the digital device 7010 may detect a gesture of moving the digital device 7010 downward as the predetermined gesture for mode switching. At this time, the digital device 7010 may detect the gesture of moving the digital device 7010 downward by detecting movement of the digital device 7010 using a gesture sensor unit provided in the digital device 7010. A detailed description of the gesture sensor unit has been given above with reference to FIG. 1. Otherwise, the digital device 7010 may detect a gesture of lowering the height of the digital device 7010 by acquiring the position of the digital device 7010 in real time through a position acquisition unit, as the predetermined gesture.

In accordance with another embodiment, as exemplarily shown in FIG. 7(*b*), the digital device 7010 may indirectly detect the predetermined gesture by detecting a predetermined user image. In this embodiment, the predetermined user image may include the image of the head, face, eye, or iris of a user. The digital device 7010 may detect the predetermined user image using a camera unit provided on the front surface of the digital device 7010. Detection of the predetermined user image through the camera unit provided on the front surface of the digital device 7010 may mean that the user is looking at the digital device 7010. Therefore, the digital device 7010 may indirectly detect the predetermined gesture by detecting the predetermined user image through the camera unit provided on the front surface of the digital device 7010. That is, in this embodiment, when the digital device 7010 detects the predetermined user image through the camera unit, the digital device 7010 may switch from the call mode to the message mode.

In accordance with another embodiment, as exemplarily shown in FIG. 7(*c*), the digital device 7010 may indirectly detect the predetermined gesture by detecting a relative position of the digital device 7010 to the external device 7020. In more detail, the digital device 7010 may detect a gesture of lowering the height of the digital device 7010 based on the height of the external device 7020 as the predetermined gesture for mode switching. First, the digital device 7010 may acquire the height of the digital device 7010 using a position acquisition unit. Thereafter, the digital device 7010 may transmit/receive information regarding the heights of the respective devices 7010 and 7020 using a communication unit. The digital device 7010 may perform a mode switching by detecting the gesture of lowering the height of the digital device 7010 based on the height of the external device 7020 as the predetermined gesture by comparing the height of the external device 7020 with the height of the digital device 7010. That is, the digital device 7010 may perform the mode switching to the message mode when the height of the digital device 7010 is lower than the height of the external device 7020.

In addition, the digital device 7010 may detect a user gesture to secure the field of view of the digital device 7010 in various manners, and is not limited to the above-described embodiments.

The above-described embodiments may be applied to the case in which the external device 7020 switches from the call mode to the message mode. Therefore, the external device 7020 may perform switching to the message mode by detecting a gesture of moving the external device 7020 downward. Otherwise, the external device 7020 may perform switching to the message mode by detecting a predetermined user image. Otherwise, the external device 7020 may perform switching to the message mode by detecting a gesture of lowering the height of the external device 7020 based on the digital device 7010.

Figure 8:
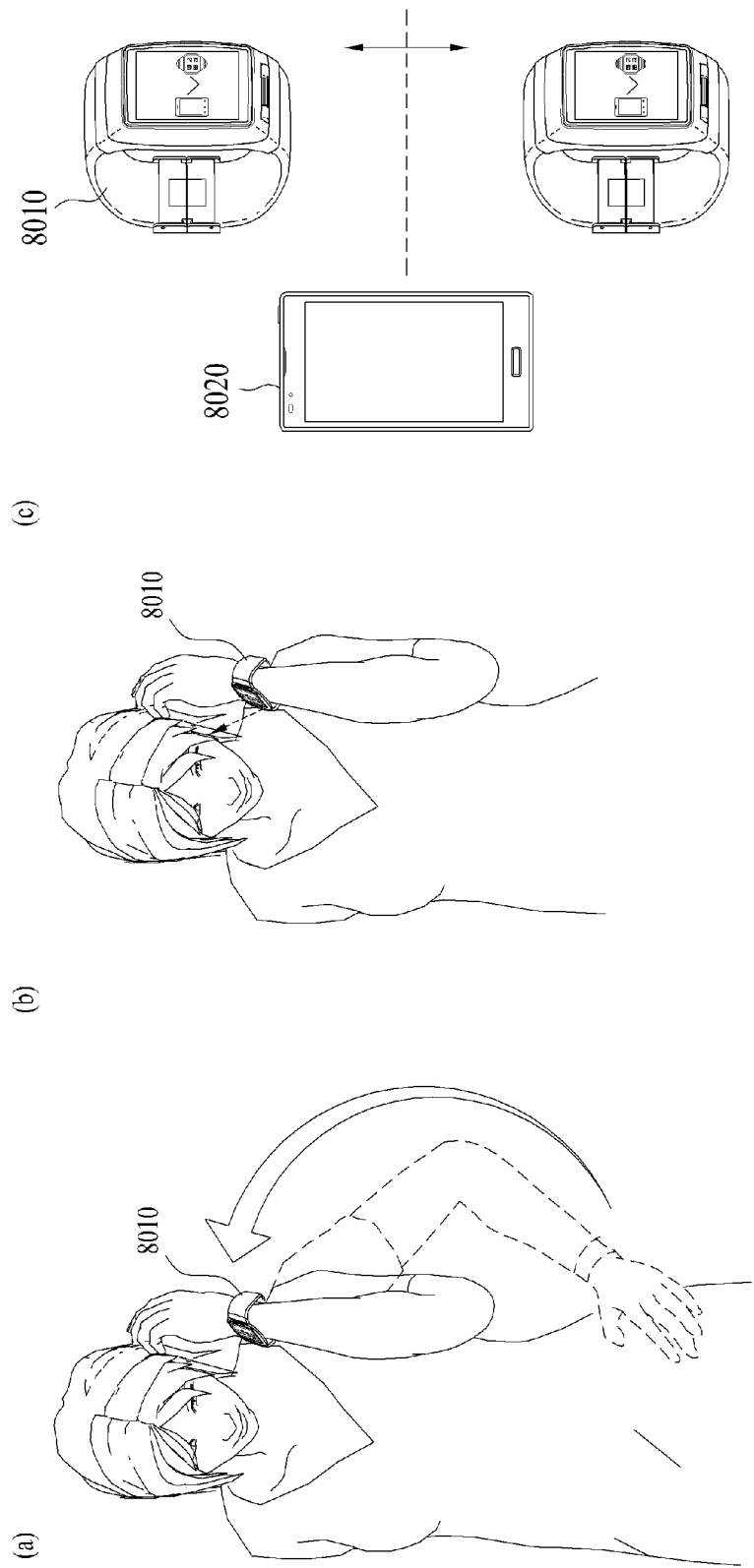
FIGS. 8(a) to 8(c) are views illustrating various predetermined gestures with respect to an external device in accordance with embodiments.

FIGS. 8(*a*) to 8(*c*) are views illustrating various predetermined gestures of an external device 8010 in accordance with embodiments. Particularly, FIGS. 8(*a*) to 8(*c*) illustrate various methods of detecting a predetermined gesture in switching of the external device 8010 from the message mode to the call mode in accordance with embodiments. These embodiments may be applied to switching of a digital device 8020 from the message mode to the call mode. A description of parts shown in FIGS. 8(*a*) to 8(*c*), which are substantially the same as or similar to those of FIGS. 7(*a*) to 7(*c*), will be omitted.

First, the external device 8010 may detect a gesture of moving the external device 8010 toward a user's face as the predetermined gesture for switching to the call mode. The reason for this is that, in order to cause a user to properly use the functions provided by the call mode, the external device 8010 needs to be moved toward a user's eye or lip. The external device 8010 may detect the predetermined gesture in various manners.

In accordance with one embodiment, as exemplarily shown in FIG. 8(*a*), the external device 8010 may detect a gesture of moving the external device 8010 upward as the predetermined gesture for mode switching. At this time, the external device 8010 may detect the user gesture of moving the external device 8010 upward by detecting movement of the external device 8010 using a gesture sensor unit provided in the external device 8010. Otherwise, the external device 8010 may detect the predetermined gesture by detecting a gesture of raising the height of the external device 8010 by acquiring the position of the external device 8010 in real time through a position acquisition unit.

In accordance with another embodiment, as exemplarily shown in FIG. 8(*b*), the external device 8010 may indirectly detect the predetermined gesture by detecting a predetermined user image. In this embodiment, the external device 8010 may use a camera unit in detection of the user image, as described above with reference to FIG. 7(*b*). In this embodiment, the predetermined user image may include the images of the side of the face, ear, and lip of a user. Detection of the images of the side of the face, ear, and lip of the user through the camera unit provided on the front surface of the external device 8010 may mean that the user moves the external device 8010 toward the side of the face, ear, and lip of the user. Therefore, the external device 8010 may indirectly detect the predetermined gesture by detecting the predetermined user image through the camera unit provided on the front surface of the external device 8010. That is, in this embodiment, when the external device 8010 detects the predetermined user image through the camera unit, the external device 8010 may switch from the message mode to the call mode.

In accordance with another embodiment, as exemplarily shown in FIG. 8(*c*), the external device 8010 may indirectly detect the predetermined gesture by detecting a relative position of the external device 8010 to the digital device 8020. In more detail, the external device 8010 may detect a gesture of raising the height of the external device 8010 based on the height of the digital device 8020 as the predetermined gesture for mode switching. First, the external device 8010 may acquire the height of the external device 8010 using a position acquisition unit. Thereafter, the external device 8010 may transmit/receive information regarding the heights of the respective devices 8010 and 8020 using a communication unit. The external device 8010 may perform a mode switching by detecting the gesture of raising the height of the external device 8010 based on the height of the digital device 8020 as the predetermined gesture by comparing the height of the digital device 8020 with the height of the external device 8010. That is, the external device 8010 may perform the mode switching to the call mode when the height of the external device 8010 is higher than the height of the digital device 8020.

In addition, the external device 8010 may detect a user gesture of moving the external device 8010 toward a user's face in various manners, and is not limited to the above-described embodiments.

The above-described embodiments may be applied to the case in which the digital device 8020 switches from the message mode to the call mode. Therefore, the digital device 8020 may perform switching to the call mode by detecting a gesture of moving the digital device 8020 upward. Otherwise, the digital device 8020 may perform switching to the call mode by detecting a predetermined user image. Otherwise, the digital device 8020 may perform switching to the call mode by detecting a gesture of raising the height of the digital device 8020 based on the external device 8010.

Figure 9A:
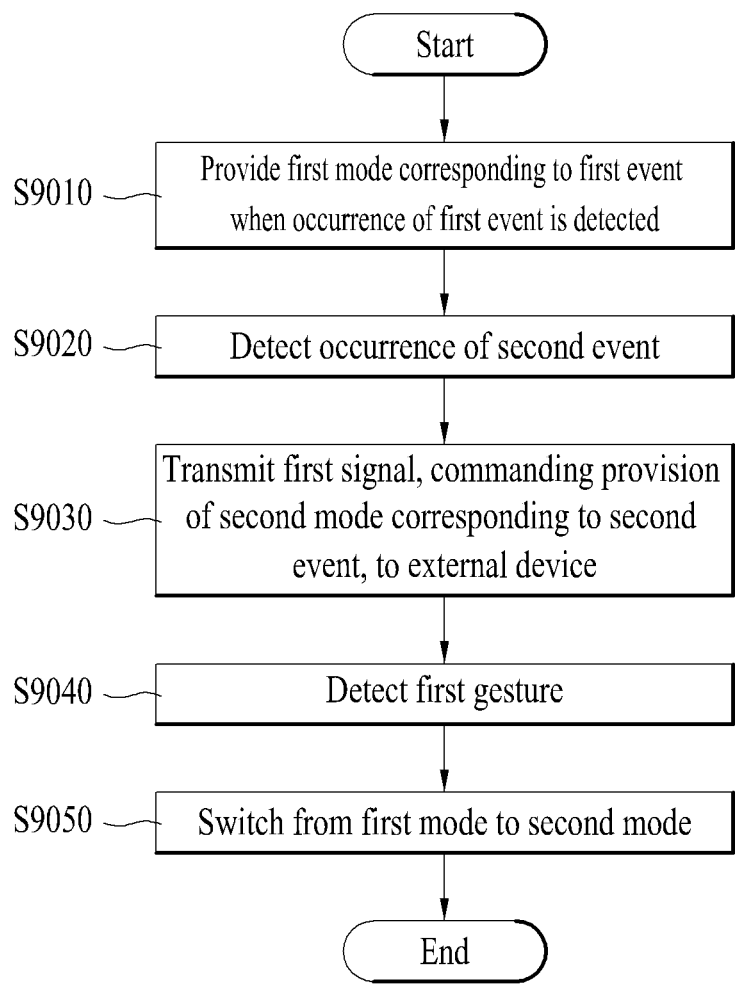
FIG. 9A is a flowchart illustrating a control method of a digital device in accordance with one embodiment.

FIG. 9A is a flowchart illustrating a control method of a digital device in accordance with one embodiment. In the flowchart of FIG. 9A, a detailed description of parts, which are substantially the same as or similar to those shown in FIGS. 1 to 8(*c*), will be omitted.

First, the digital device may detect occurrence of a first event. Here, the first event may include an incoming call event or an incoming message event occurring in the digital device and/or an external device. In the flowchart of FIG. 9A, the case in which the first event is an incoming call event will be described. When the digital device detects occurrence of the first event, the digital device may provide a first mode corresponding to the first event (Operation S9010). Here, the first mode may be a call mode providing various functions regarding the incoming call event occurring in the digital device and/or the external device. A detailed description of the call mode has been given above with reference to FIG. 3.

Thereafter, the digital device may detect occurrence of a second event (Operation S9020). Here, the second event may include an incoming call event or an incoming message event most recently occurring in the digital device and/or the external device. In the flowchart of FIG. 9A, the case in which the second event is an incoming message event will be described.

Thereafter, the digital device may transmit a first signal, i.e., a signal commanding provision of a second mode corresponding to the second event, to the external device (Operation S9030). Here, the second mode may be a message mode providing various functions regarding the incoming message event occurring in the digital device and/or the external device. A detailed description of the message mode has been given above with reference to FIG. 3. Further, the first signal may include information regarding the mode currently provided by the digital device.

Thereafter, the digital device may detect a first gesture, i.e., a gesture with respect to the digital device (Operation S9040). The first gesture is a predetermined gesture with respect to the digital device, and may be a user gesture of moving the digital device to secure the field of view of the digital device. The digital device may detect the first gesture using a gesture sensor unit, a camera unit, a communication unit, and/or a position acquisition unit, and a detailed description thereof has been given above with reference to FIGS. 7(*a*) to 7(*c*).

Thereafter, the digital device having detected the first gesture may switch from the first mode to the second mode (Operation S9050). Such a mode switching of the digital device may be performed independently of or dependently upon the external device according to embodiments. That is, when the digital device detects the first gesture, the digital device may perform the mode switching independently of the mode switching of the external device. Otherwise, when the digital device detects the first gesture together with a second gesture with respect to the external device, the digital device may perform the mode switching. A detailed description thereof has been given above with reference to FIG. 4C.

Figure 9B:
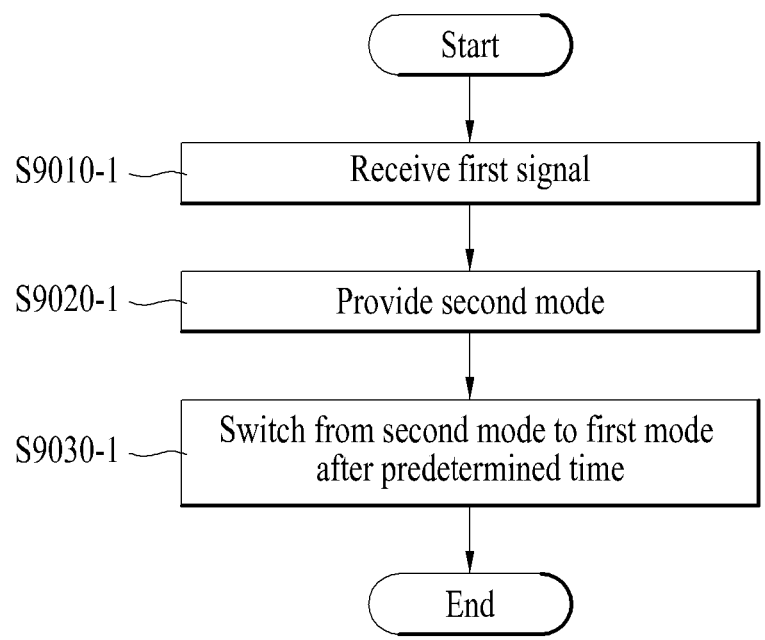
FIG. 9B is a flowchart illustrating a control method of an external device in accordance with one embodiment.

FIG. 9B is a flowchart illustrating a control method of an external device in accordance with one embodiment. Particularly, operation of the external device shown in the flowchart of FIG. 9B may be performed in connection with operation of the digital device shown in the flowchart of FIG. 9A. In the flowchart of FIG. 8, a detailed description of parts, which are substantially the same as or similar to those shown in FIGS. 1 to 8(*c*), will be omitted.

First, the external device may receive the first signal from a digital device (Operation S9010-1). That is, the external device may receive the first signal transmitted by the digital device in Operation S9030 of FIG. 9A. Here, the first signal may be a signal commanding provision of a second mode and/or a signal representing mode currently provided by digital device.

Thereafter, the external device may provide the second mode (Operation S9020-1). Although not shown in the flowchart of FIG. 9B, the external device may provide notifications regarding the second event simultaneously with provision of the second mode. The external device may inform a user of occurrence of a second event by providing visual, auditory, and tactile notifications. A detailed description thereof has been given above with reference to FIG. 4B.

Thereafter, the external device may switch from the second mode to the first mode, when a predetermined time after provision of the second mode has elapsed (Operation S9030-1). The predetermined time may be a time taken to detect a second gesture with respect to the external device after provision of the second mode. The predetermined time may be variously set according to user, design of the device, using purpose, and kind of executing application. The external device may detect a user gesture of moving the external device toward the user's face as the second gesture. Here, the external device may detect the second gesture in various manners, and a detailed description thereof has been given above with reference to FIGS. 8(*a*) to 8(*c*).

As apparent from the above description, in accordance with one embodiment, a digital device and an external device have modes corresponding to events occurring in the digital device and the external device in common and thus, the plural devices may provide one mode. Therefore, a user may select a device using functions of each mode by himself/herself.

In accordance with another embodiment, a mode switching is performed through a gesture with respect to each device and thus, a user may easily select a device to effectively use functions of each mode through a simple gesture of each device.

Further, in accordance with yet another embodiment, a digital device and an external device detect predetermined gestures for mode switching in various manners and thus, accuracy in detection of the predetermined gestures may be increased.

Although respective drawings are divisionally described for convenience of description, the embodiments described in the respective drawings may be designed so as to be combined to implement a new embodiment. When necessary, design of a recording medium readable by a computer in which a program to execute the above-described embodiments is recorded may fall within the scope of the appended claims and their equivalents.

Further, a digital device and a control method thereof are not limited to the configurations and methods of the above-described embodiments, and the above-described embodiments may be fully or partially selectively combined so as to implement various modifications.

Although embodiments have been described with reference to a number of illustrative embodiments thereof, it should be understood that numerous other modifications and embodiments can be devised by those skilled in the art that will fall within the spirit and scope of the principles of the disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Further, the digital device and control method thereof in the disclosure may be implemented as codes in recording media readable by a processor provided in a network device. The recording media readable by the processor include all kinds of recording devices in which data read by the processor is stored. For example, the recording media readable by the processor may include ROMs, RAMs, magnetic tapes, floppy disks, and optical data storage devices, and be implemented as a carrier wave, such as transmission through Internet. Further, the recording media readable by the processor may be distributed through a computer system connected through a network, and codes readable by the processor in a distributed manner may be stored and executed.

Further, times and positions in the disclosure may mean correct values, and include substantial times and positions of designated ranges. That is, the times and positions in the disclosure may be substantial times and positions, and designated ranges of errors thereof may be present.

Further, although the disclosure has described both product inventions and process inventions, description of both inventions may be complementarily applied as needed.

What is claimed is:

1. A digital device comprising:
a communication unit configured to transmit and receive a signal with an external device being operated by a user of the digital device;
a display unit configured to display an image;
a gesture sensor unit configured to sense a gesture with respect to the digital device; and
a processor configured to control the communication unit, the display unit and the gesture sensor unit,
wherein the processor is further configured to:
when occurrence of an incoming call event is detected, execute an incoming call mode corresponding to the incoming call event,
when occurrence of an incoming message event is detected during the execution of the incoming call mode, transmit a first signal to the external device,
wherein the first signal is a control signal for the external device to execute an incoming message mode corresponding to the incoming message event, and to display an incoming message information detected by the digital device, and
when a first gesture being made by moving downward the digital device is detected, switch the digital device from the incoming call mode to the incoming message mode and display the incoming message information being displayed in the external device on the display unit.

2. The digital device according to claim 1, wherein the first signal is the control signal for the external device to execute the incoming message mode and to display the incoming message information until the external device detects a second gesture.

3. The digital device according to claim 2, wherein the processor is further configured to detect a second signal, and wherein the second signal is a control signal being transmitted from the external device when the external device detects the second gesture.

4. The digital device according to claim 3, wherein, when detecting the first gesture and reception of the second signal after transmission of the first signal, the processor is further configured to switch from the incoming call mode to the incoming message mode.

5. The digital device according to claim 3, wherein, when detecting the first gesture and not detecting reception of the second signal after transmission of the first signal, the processor is further configured to switch from the incoming call mode to a multi-tasking mode corresponding to the incoming call event and the incoming message event.

6. The digital device according to claim 5, wherein the multi-tasking mode simultaneously provides a speakerphone response to the incoming call event and a message response to the incoming message event.

7. The digital device according to claim 2, wherein the second gesture is a gesture that the external device is moved upward.

8. The digital device according to claim 1, wherein the processor is further configured to provide an input user interface to input a response message to the incoming message event in the incoming message mode.

9. The digital device according to claim 1, wherein, when occurrence of the incoming call event or the incoming message event is detected, the processor is further configured to provide a notification notifying of occurrence of the incoming call event or the incoming message event.

10. The digital device according to claim 1, wherein the first signal is the control signal controlling the external device to provide notification notifying of the incoming message event detected by the digital device.

11. The digital device according to claim 1, further comprising a position acquisition unit acquiring a position of the digital device.

12. The digital device according to claim 11, wherein the processor is further configured to:
receive a third signal regarding a first altitude of the external device from the external device, and
detect the first gesture when a second altitude of the digital device is less than the first altitude.

13. The digital device according to claim 1, further comprising a camera unit configured to capture an image,
wherein, when detecting a user image using the camera unit after transmission of the first signal, the processor is further configured to switch from the incoming call mode to the incoming message mode.

14. The digital device according to claim 1, wherein, when detecting a third gesture with respect to the digital device, the processor is further configured to re-switch from the incoming message mode to the incoming call mode.

15. The digital device according to claim 1, wherein the incoming message event is an incoming event which most recently occurs.

16. The digital device according to claim 1, wherein, when detecting the first gesture within a predetermined time after transmission of the first signal, the processor is further configured to switch from incoming call mode to the incoming message mode.

17. The digital device according to claim 1, wherein the external device is a wearable device.

18. A control method of a digital device comprising:
executing an incoming call mode corresponding to an incoming call event when occurrence of the incoming call event is detected;
detecting occurrence of an incoming message event during an execution of the incoming call mode;
transmitting a first signal to an external device being operated by a user of the digital device, wherein the first signal is a control signal for the external device to execute an incoming message mode corresponding to the incoming message event, and to display an incoming message information detected by the digital device;

detecting a first gesture being made by moving downward the digital device; and in response to the detected first gesture, switching the digital device from the incoming call mode to the incoming message mode and displaying the incoming message information being displayed in the external device on a display unit of the digital device.

19. The control method according to claim 18, wherein the first signal is the control signal for the external device to execute the incoming message mode and to display the incoming message information until the external device detects a second gesture.

20. The control method according to claim 19, further comprising:

detecting a second signal, wherein the second signal is a control signal being transmitted from the external device when the external device detects the second gesture.

21. The control method according to claim 20, wherein the switching from the incoming call mode to the incoming message mode is performed when the first gesture and reception of the second signal are detected after transmission of the first signal.

22. The control method according to claim 20, further comprising, when detecting the first gesture and not detecting reception of the second signal after transmission of the first signal, switching from the incoming call mode to a multi-tasking mode corresponding to the incoming call event and the incoming message event.

23. The control method according to claim 22, wherein the multi-tasking mode simultaneously provides a speakerphone response to the incoming call event and a message response to the incoming message event.

24. The control method according to claim 19, wherein the second gesture is a gesture that the external device is moved upward.

* * * * *